United States Patent [19]

Ina et al.

[11] Patent Number: 4,843,557

[45] Date of Patent: Jun. 27, 1989

[54] OVERALL DIAGNOSIS APPARATUS FOR VEHICLE-MOUNTED CONTROL DEVICES

[75] Inventors: Katsuhiro Ina, Okazaki; Yuji Hirabayashi, Aichi; Kazuaki Minami, Anjo; Katsunori Ito, Aichi; Susumu Akiyama, Kariya; Hidemichi Tanabe, Nagoya, all of Japan

[73] Assignee: Nippondenso Co., Ltd., Kariya, Japan

[21] Appl. No.: 740

[22] Filed: Jan. 6, 1987

[30] Foreign Application Priority Data

Jan. 9, 1986 [JP] Japan .................................. 61-1316

[51] Int. Cl.$^4$ ...................... G06F 11/00; G06F 11/32; G08B 26/00
[52] U.S. Cl. ............................. 364/431.77; 340/459; 371/16; 371/29
[58] Field of Search ............... 364/431.11, 424.1, 551; 371/16, 29; 340/52 F

[56] References Cited

U.S. PATENT DOCUMENTS

| | | | |
|---|---|---|---|
| 4,267,569 | 5/1981 | Baumann et al. | 364/431.01 |
| 4,443,784 | 4/1984 | Franzen et al. | 340/52 F |
| 4,497,057 | 1/1985 | Kato et al. | 371/29 |
| 4,521,885 | 6/1985 | Melocik et al. | 371/29 |
| 4,525,783 | 6/1985 | Pischke et al. | 364/431.11 |
| 4,546,647 | 10/1985 | Takahashi | 340/52 F X |
| 4,551,801 | 11/1985 | Sokol | 364/551 |
| 4,583,176 | 4/1986 | Yamato et al. | 364/431.11 |
| 4,667,176 | 5/1987 | Matsuda | 340/52 F |

FOREIGN PATENT DOCUMENTS

| | | | |
|---|---|---|---|
| 54-67737 | 5/1979 | Japan . | |
| 58-26652 | 2/1983 | Japan | 340/52 F |

OTHER PUBLICATIONS

Ono et al., Microprocessor Controls Engine and Transmission. Soc. of Automotive Engineers, vol. 91, No. 8, pp. 42–45, 1983.

Mohl et al., Elektronische Getriebesteuerung Bosch Technische Berichte 7, 1983/4, pp. 160–166.

*Primary Examiner*—Felix D. Gruber
*Attorney, Agent, or Firm*—Cushman, Darby & Cushman

[57] ABSTRACT

A plurality of control systems mounted on a vehicle such as an automobile, and provided for different controlled objects are respectively made of control computers. These control computers are linked by a common data bus. These computers exclusively execute, for example, an engine control, a transmission control, a brake control, a suspension control, and a auto drive control. The data bus is further connected to a diagnosis computer. Each control computer detects a signal from the sensor provided corresponding to each controlled object, and outputs the detect signal to the data bus. Each control computer executes the logical operation for its control on the basis of its detect signal and various data transferred to the data bus. The diagnosis computer supervises an operating state of each control system on the basis of the data transferred to the data bus. When an abnormality is detected, the diagnosis computer stores this data in a large-capacity memory, and displays the abnormality.

15 Claims, 11 Drawing Sheets

OVERALL DIAGNOSIS APPARATUS FOR VEHICLE-MOUNTED CONTROL DEVICES

BACKGROUND OF THE INVENTION

This invention relates to a diagnosis apparatus for diagnosing trouble occurring in any of the electronic control devices mounted on a vehicle, and for implementing control systems for controlled objectives, such as an engine control system and a transmission control system.

Many types of control systems mounted on a vehicle, for controlling the operation of the vehicle, employ electronics. These control systems include, for example, a system for electronically controlling the engine, systems for electronically controlling a transmission mechanism for transmitting engine power, and a system for electronically monitoring and controlling a braking operation. The control devices implementing these electronic control systems are individually provided and independently execute their control operations.

The control devices forming control systems are operated under their own controls. For example, when a problem occurs, these devices diagnose the problem independently. A simple element to detect the problem, for example, a sensor, performs the diagnosing function in each of the control devices.

In the above diagnostic system, a plurality of control devices are provided and independently execute the diagnostic operations, as described above. With this scheme, when the operation of one control system is abnormal, there are cases that the control system fails to identify its abnormal operation.

SUMMARY OF THE INVENTION

Accordingly, an object of this invention is to provide an overall diagnosis apparatus which, when trouble occurs in any one of a plurality of control systems carried on a vehicle, can systematically detect the trouble no matter which control system is faulty, and can systematically and comprehensively diagnose problems in all of the control systems, which independently perform their control operations.

Another object of this invention is to provide an overall diagnosis apparatus which can diagnose troubles of the control systems in a correlative manner, ensuring reliable diagnosis and enabling an overall supervising of the trouble phenomena.

Yet another object of this invention is to provide an overall diagnosis apparatus which can supervise the operation of a plurality of control systems, and can give warning to the driver and instructions to a repair shop as to how to repair, and provide the operation data of the devices when trouble occurs, whereby good safety control of vehicles is realized, and proper measures can be effectively taken for troubles.

An overall diagnosis apparatus carried on a vehicle according to this invention comprises a plurality of computers forming a plurality of control systems and carried on a vehicle and a diagnosis computer for overall diagnosis operation. The control computers and the diagnosis computer are linked by a data transfer means including a data bus. The diagnosis computer executes the overall vehicle running diagnosis on the basis of the data transferred from each control computer through the transfer means.

In the overall diagnosis apparatus, each control computer diagnoses the sensors and the like connected to that control computer. Further, the diagnosis computer comprehensively judges the operation data from the respective control computers, and performs the diagnosis operation on the basis of the interrelationship of the electronic control data carried on the vehicle, for example. With such an arrangement, the overall diagnosis apparatus can not only make the diagnosis on the basis of the detect signals from the sensors and the like, but also detect the premonitory phenomenon of trouble. Therefore, the overall diagnosis control can be effectively executed. The warning to the driver and the indication of the diagnosis results in a repair shop are effectively realized.

DETAILED DESCRIPTION OF THE PREFERRED EMBODIMENT

Figure 1:
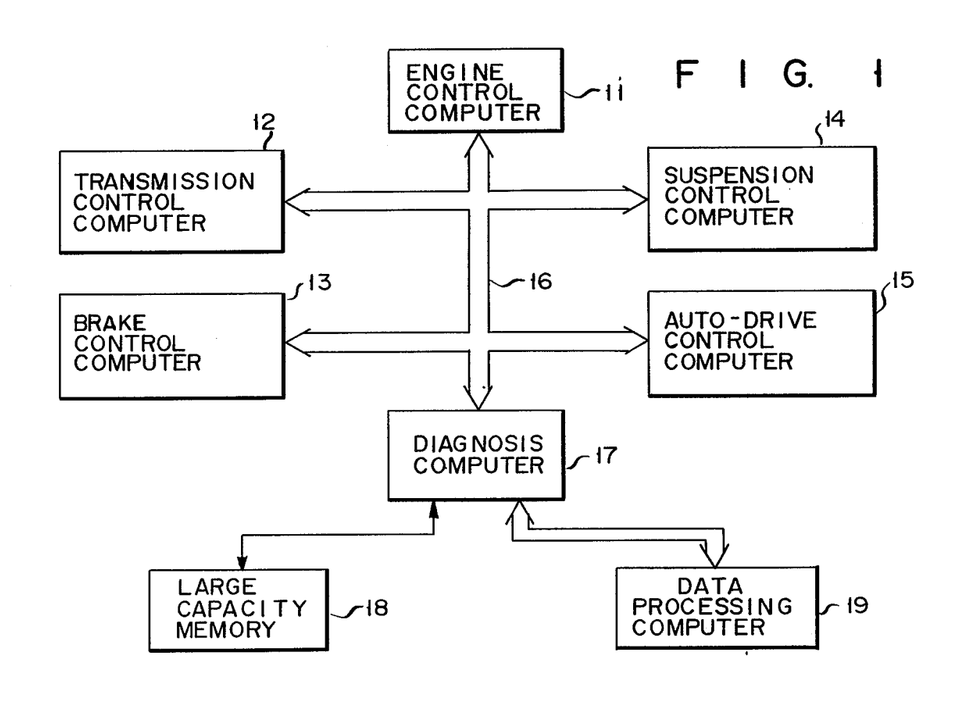
FIG. 1 is a block diagram entirely describing an overall diagnosis apparatus according to an embodiment of this invention.

A vehicle such as an automobile has various types of electronic control systems mounted on it, such as an engine control system, a transmission control system, a brake control system, an auto-drive control system, and a suspension control system, as shown in FIG. 1.

Control computers 11 to 15 independently execute the control programs provided exclusively for the corresponding systems. Detection signals from the sensors provided for the respective control systems are input to the corresponding control computers.

Control computers 11 to 15, which are respectively provided for controlled objects, are connected together into common data bus 16 for serial communication. Bus 16 may, for example, be in the form of an optical fiber. Diagnosis computer 17 is connected to data bus 16. Diagnosis computer 17 controls and executes overall diagnosis such as troubleshooting control computers 11 to 15, and the controlled objects.

Diagnosis computer 17 is provided with large capacity memory 18, and is connectable to external data processing computer 19, when necessary.

Control computers 11 to 15, which are provided for respective control systems and serve as terminal devices, are connected to a network formed by data bus 16, which is centralized in connection at diagnosis computer 17. The diagnosis data and the device operation data from respective control computers 11 to 15 are supervised by diagnosis computer 17 in a centralized manner.

Control computers 11 to 15 connected to the network of data bus 16 will now be described using specific examples.

Figure 2:
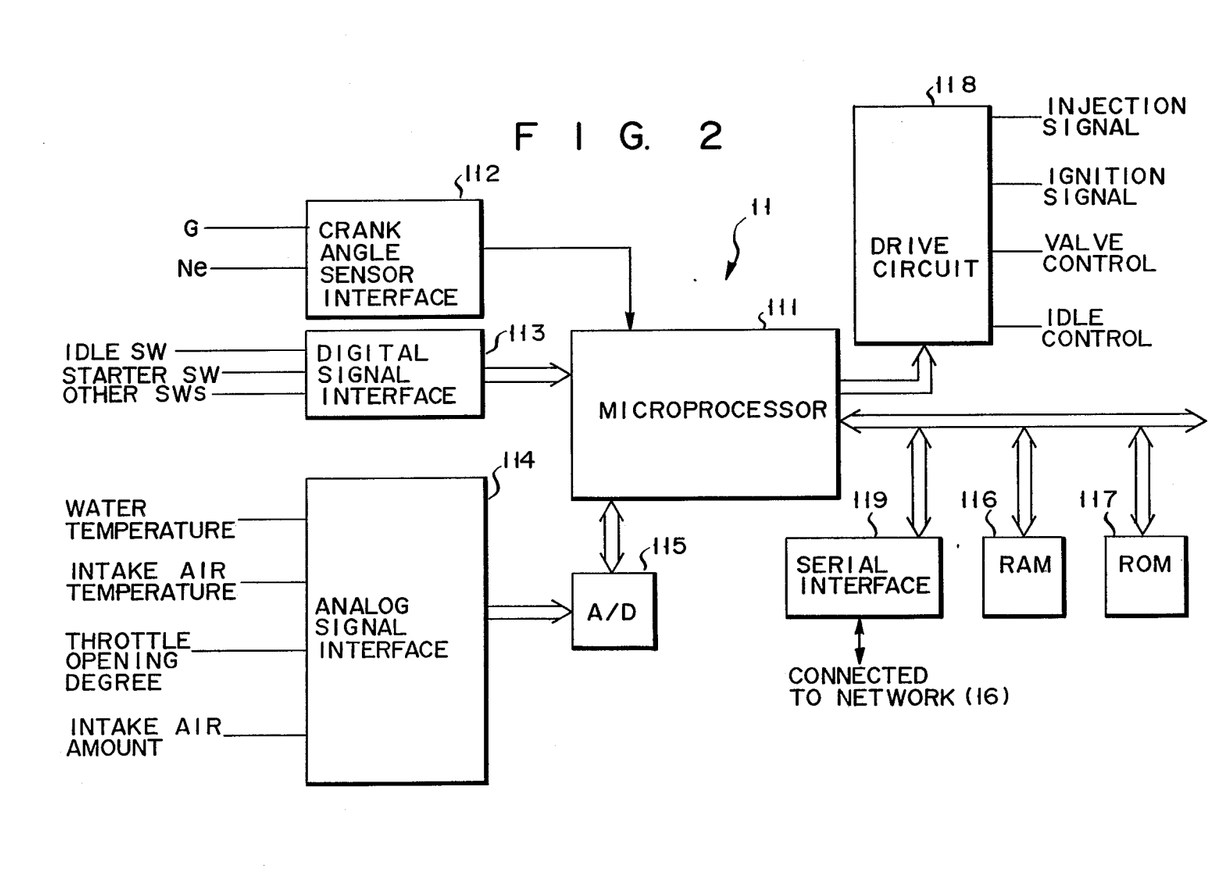
FIG. 2 is a block diagram illustrating an engine control computer incorporated into the diagnosis apparatus.

FIG. 2 illustrates a configuration of a control computer 11 for an engine control system. Computer 11 has a microprocessor 111. Microprocessor 111 is provided with crank angle signal G and speed signal Ne from a crank angle sensor (not shown) via interface 112. Crank angle signal G contains a pulse signal generated each time the crankshaft of the engine is revolved 360°. Speed signal Ne contains a pulse signal generated each time the crankshaft is revolved 30°. Microprocessor 111 receives an idle switch signal, a starter switch signal, and other switch signals from, for example, an air-conditioner, via digital signal interface 113. Furthermore, microprocessor 111 receives the detect signals representative of temperature of cooling water for the engine, intake air temperature, throttle opening, and the intake air amount, via analog signal interface 114 and A/D converter 115.

Microprocessor 111 is connected with RAM 116 for storing data such as operated data and ROM 117 for storing the program data, via a data bus. Control command signals for controlling the engine are output from microprocessor 111 to drive circuit 118.

The data bus is further connected to serial interface 119. This interface 119 serially outputs various detect signals to microprocessor 111, the engine speed, signal and the diagnosis data, for example, as processed by microprocessor 111, to common data bus 16.

Drive circuit 118 outputs various command signals for the controlled object, i.e. the engine, carried on the vehicle, such as a fuel injection command signal, an ignition command signal, and command signals for controlling the engine valves and the like. By the control data logically operated on the basis of the detect signals relating to the operating conditions of the engine, the engine is appropriately controlled.

Figure 3:
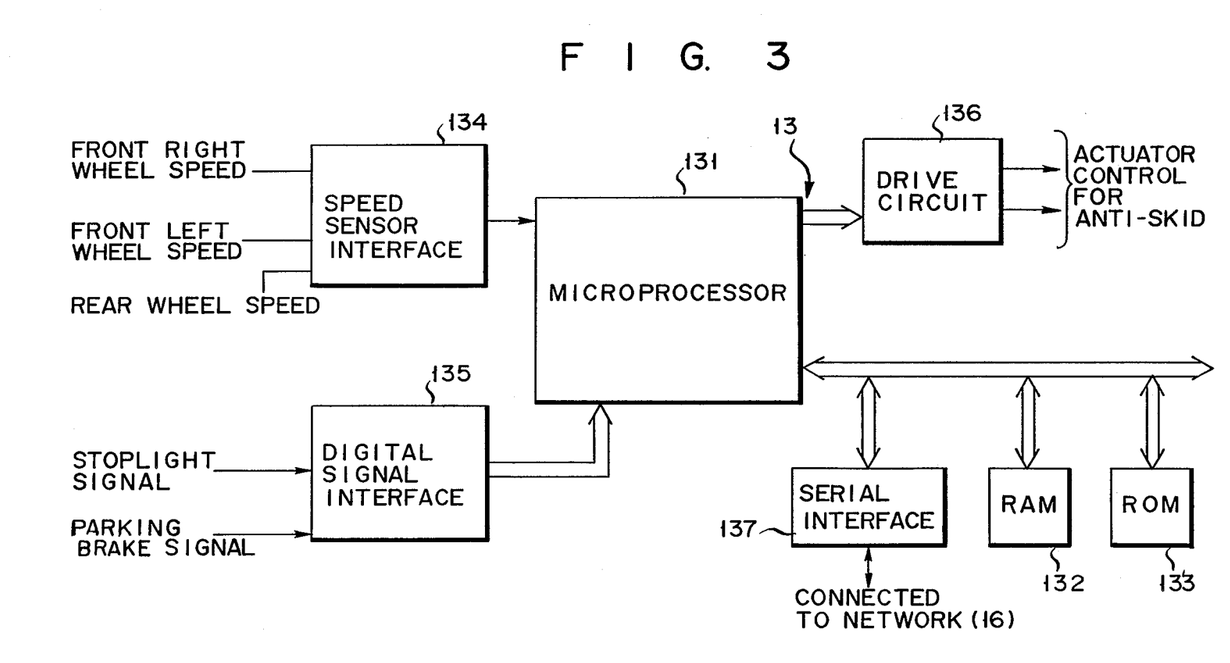
FIG. 3 is a a block diagram illustrating a brake control computer.

FIG. 3 illustrates a configuration of brake control computer 13 for the brake control system. Computer 13 also performs wheel skid control. Computer 13 includes microprocessor 131. Microprocessor 131 is connected with RAM 132 and ROM 133 via a data bus. Microprocessor 131 also receives, via speed sensor interface 134, the vehicle speed data which is based on the wheel speed detect signal from a wheel sensor (not shown). Further, microprocessor 131 receives a stoplight signal and a parking brake signal and the like, via digital signal interface 135.

Microprocessor 131 logically geoerates a skid control command on the basis of the input detect signals. The result of the operation is an output to drive circuit 136. Drive circuit 136 then outputs an actuator drive command signal, which is used for skid control. Microprocessor 131 is connected to data bus 16 via serial interface 137. Data such as wheel speed data, brake data and diagnosis data are output to data bus 16.

Figure 4:
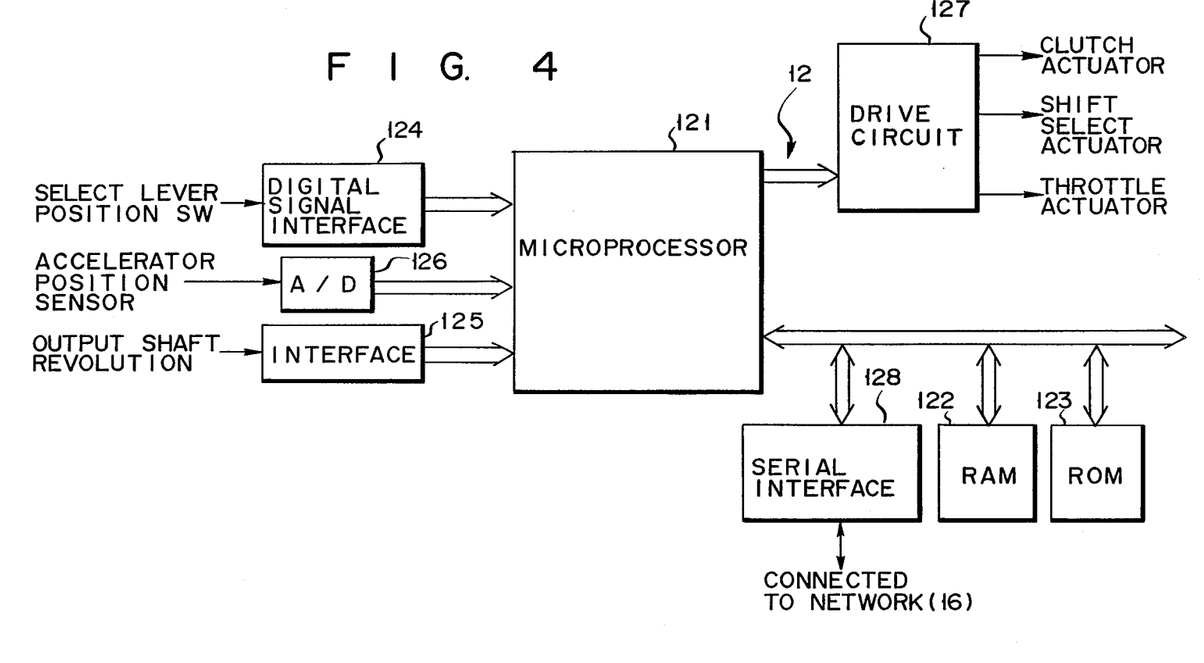
FIG. 4 is a block diagram illustrating a transmission control computer.

FIG. 4 illustrates a configuration of transmission control computer 12. By computer 12, a gear shift position of the gearbox contained in a vehicle is automatically selected in accordance with the running load. For example, under control of computer 12, the clutch is connected and disconnected, and the gear is set to a desired position. In computer 12, the logical operation for the control command is performed by microprocessor 121. Microprocessor 121 is connected to RAM 122 and ROM 123 via a data bus. Microprocessor 121 receives a select lever position signal via digital signal interface 124. Microprocessor 121 receives a signal representative of the speed of the output shaft of the transmission, via interface 125. Further, microprocessor 121 receives a detect signal from the accelerator position sensor via A/D converter 126.

In response to the input signal, microprocessor 121 performs logical operations for controlling the clutch to transmit the rotating drive force to the propeller shaft, for controlling the gear shift select to determine the gear shift position in the planetary gearbox, and for controlling the throttle. The results of the operations are output to drive circuit 127.

Many data as logically operated on the basis of the signals input to microprocessor 121, such as accelerator position data, select lever position data, vehicle speed data, and the diagnosis data from microprocessor 121 are output to the network of data bus 16 via serial interface 128.

Figure 5:
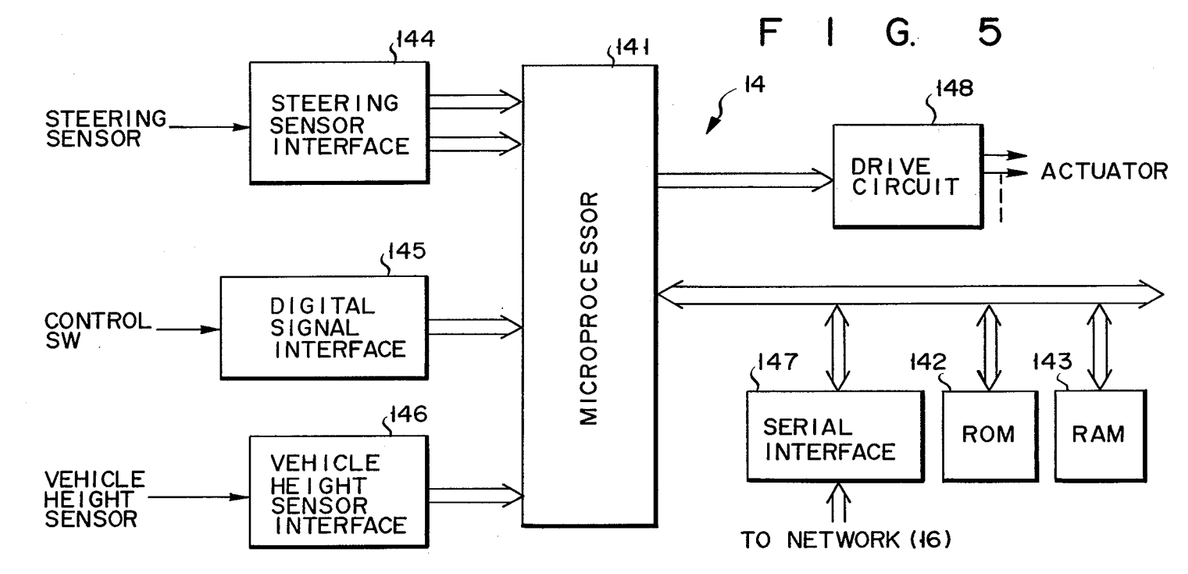
FIG. 5 is a block diagram illustrating a suspension control computer.

FIG. 5 shows a configuration of control computer 14 for performing suspension control. In response to the weight load and the running condition of the vehicle or the direction by the vehicle driver, computer 14 controls the vehicle height and the spring constant of the spring supporting the vehicle, and the damping capacity of the absorber. Suspension control computer 14 includes microprocessor 141. Microprocessor 141 is connected to RAM 142 and ROM 143 via a data bus. Microprocessor 141 is provided with steering signal from a steering sensor (not shown) via a steering sensor interface 144. Microprocessor 141 receives, via digital interface 145, a signal from control switch which is used for changing the spring constant. Microprocessor 141 further receives a vehicle height detect signal from vehicle height sensor interface 146. Microprocessor 141 is connected to data bus 16 via serial interface 147. Microprocessor 141 performs suspension control on the basis of the input signals and various data coming via the above interfaces. The result of the operation is output to drive circuit 148, which in turn supplies a drive command signal to an actuator (not shown) for suspension control.

Microprocessor 141 performs processing for detecting an abnormality in each sensor and the control system. Diagnostic data corresponding to the abnormality data is output to data bus 16 via serial interface 147. Control computer 14 outputs the steering angle data of the steering wheel, when necessary.

Figure 6:
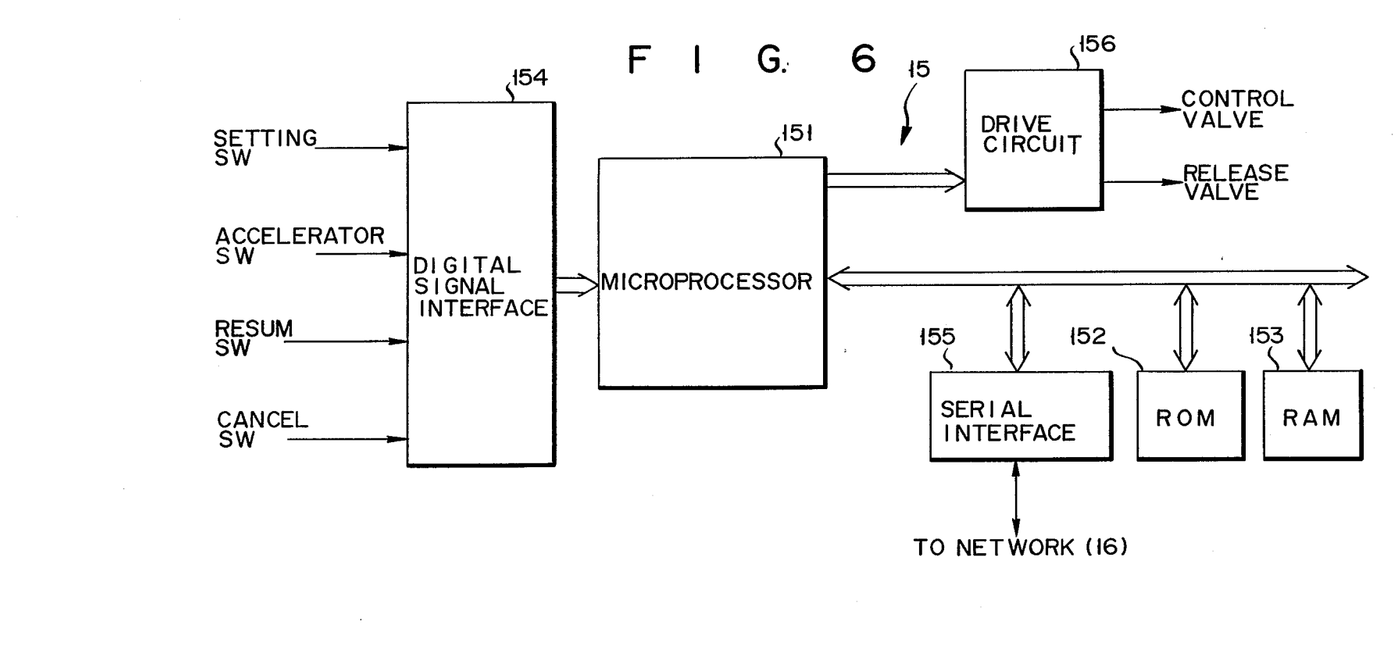
FIG. 6 is a block diagram illustrating an auto drive control computer.

FIG. 6 illustrates a specific example of control computer 15 for controlling the auto drive. Control computer 15 includes microprocessor 151 for logically operating the control data. Microprocessor 151 is connected to RAM 153 and ROM 152 via a data bus. Microprocessor processor 151 is provided with various signals for performing auto-drive control, via digital signal interface 154. For example, microprocessor receives a signal from the set switch which sets the auto-drive control, a signal from an accelerator switch, a signal from a resume switch, and a signal from a cancel switch. Microprocessor 151 fetches the vehicle speed data from data bus 16 via serial interface 155. Microprocessor 151 logically operates on the control data for intake valves, for example, on the basis of the input data, and outputs the data to drive circuit 156. By the control data, the vehicle runs at a constant speed as set.

Microprocessor 151 also performs an abnormality detection operation for detecting abnormalities in the control system, and the diagnostic data is output to data bus 16.

Figure 7:
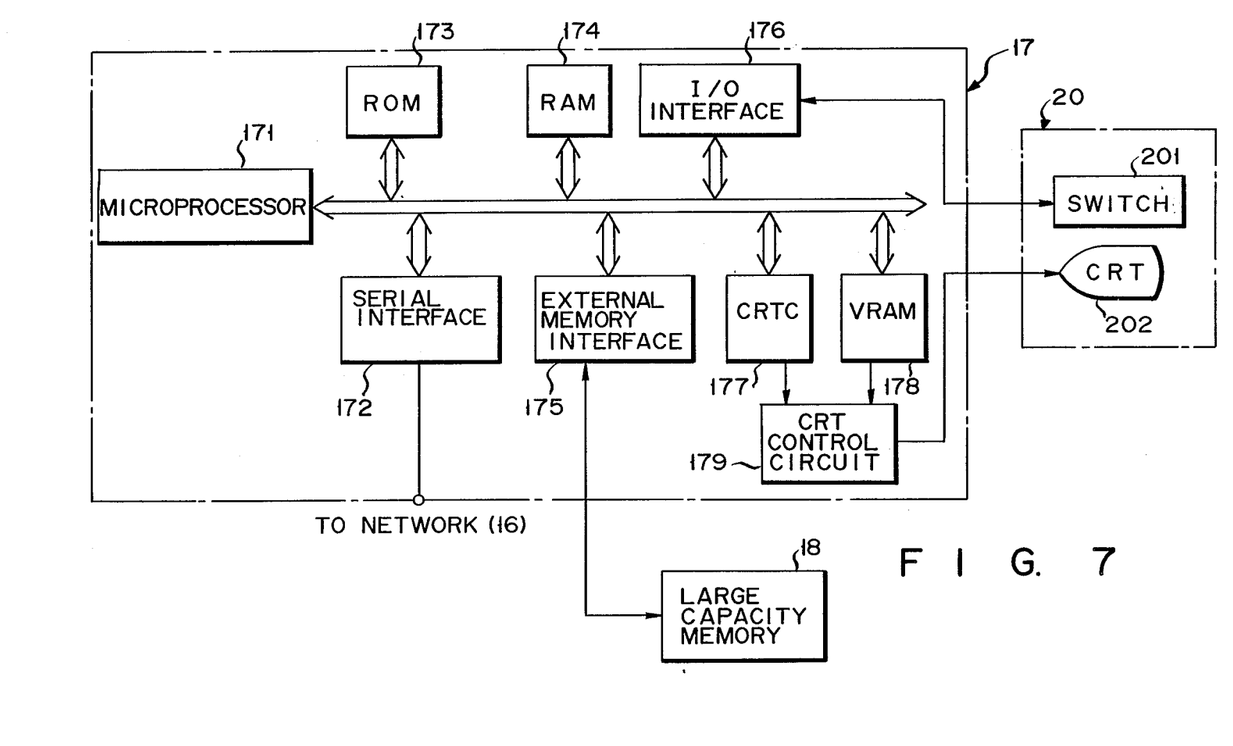
FIG. 7 is a block diagram illustrating a diagnosis computer according to the present invention.

FIG. 7 shows a specific configuration of diagnosis computer 17 connected to data bus 16 with which the above control computers 11 to 15 are linked in a network manner. Computer 17 includes microprocessor 171 for executing the diagnosis operation. Microprocessor 171 is connected to data bus 16 constituting a network, via serial interface 172.

Microprocessor 171 is connected to ROM 173 for storing the program data and RAM 174 for storing the operated data, via a data bus. The data bus is connected to interface 175 for providing an interface with the external memory device and input/output interface 176. Interface 175 is connected to large capacity memory 18. Input/output interface 176 is connected to the input-/output switch 201 in display section 20.

The data bus is further connected to CRT controller 177 and video RAM 178. By the display data based on the result of the operation by microprocessor 171, CRT control circuit 179 is driven, and the diagnosis data operated by CRT display device 202 in display section 20, is displayed.

In the computer network constructed above, a control computer, for example, engine control computer 11 fetches the data necessary for the engine control from data bus 16, in addition to the input data described referring to FIG. 2. Specifically, engine control computer 11 receives, for example, select lever position data of the transmission, gear shift position data of the gearbox, connect/disconnect data of the clutch, wheel speed data, and the brake data. On the basis of the various input data and the fetched data, computer 11 controls the engine such as the fuel injection control most fit for the vehicle running condition at that time.

Computer 13 for executing the skid control when the brake is operated, fetches gear shift position data of the gearbox, clutch connect/disconnect data, and the engine speed data and the like, and controls the braking condition. Specifically, the braking force is reduced when the wheel slip may occur, minimizing the wheel slip, and realizing an effective brake operation.

Transmission control computer 12 fetches from data bus 16, engine speed data, throttle opening data, intake air amount data, and wheel speed data, and controls the gear ratio of the transmission and the connect or disconnect of the clutch.

Diagnosis computer 17 fetches the diagnostic results diagnosed by respective control computers 11 to 15, such as a sensor disconnection, and stores the results in large capacity memory 18. Computer 17 also causes CRT display 202 to display the results. Further, computer 17 fetches engine speed data, gear shift data of the gearbox and wheel speed data and the like, which are flowing in the network of data bus 16, and on the basis of these input data, performs the diagnosis operation.

A diagnosis operation by diagnosis computer 17 will be described. Diagnosis computer 17 stores the diagnostic data transferred from respective control computers 11 to 15, and executes a program for display. This computer 17 also checks if these computers 11 to 15 operate normally, according to an interrupt subroutine, which is contained in addition to the control program.

Figure 8:
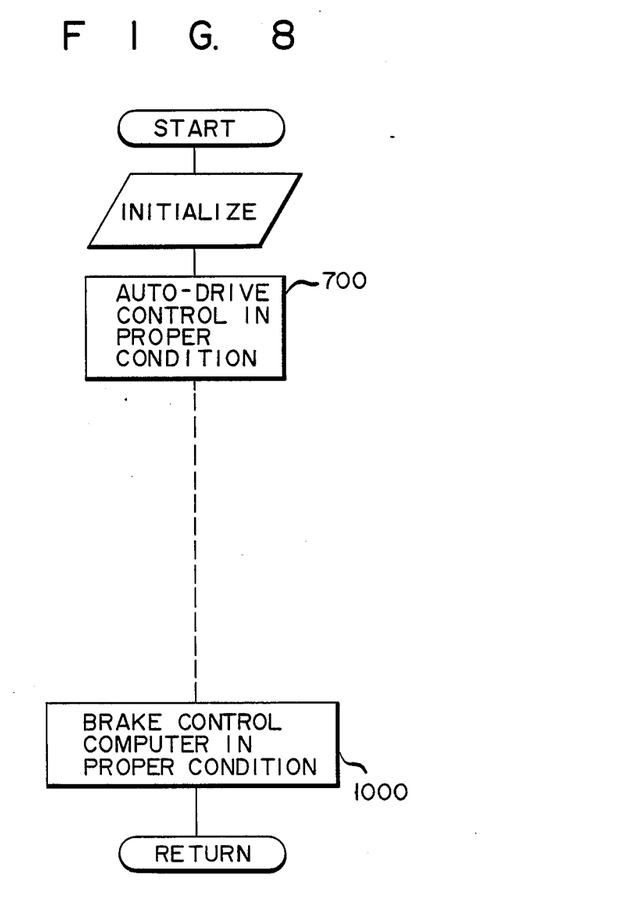
FIG. 8 shows a flowchart describing a general flow of processings of the overall diagnosis apparatus.

FIG. 8 charts a general flow of the processing by overall diagnosis computer 17. In step 700, diagnosis computer 17 checks if computer 15 for controlling auto-drive is working properly. On the basis of the result of this check, computer 17 proceeds with its subsequent control procedure. In step 1000, it is determined whether or not the brake control computer operates normally. The overall diagnosis is performed on the basis of the data produced from respective computers 11 to 15.

Figure 9:
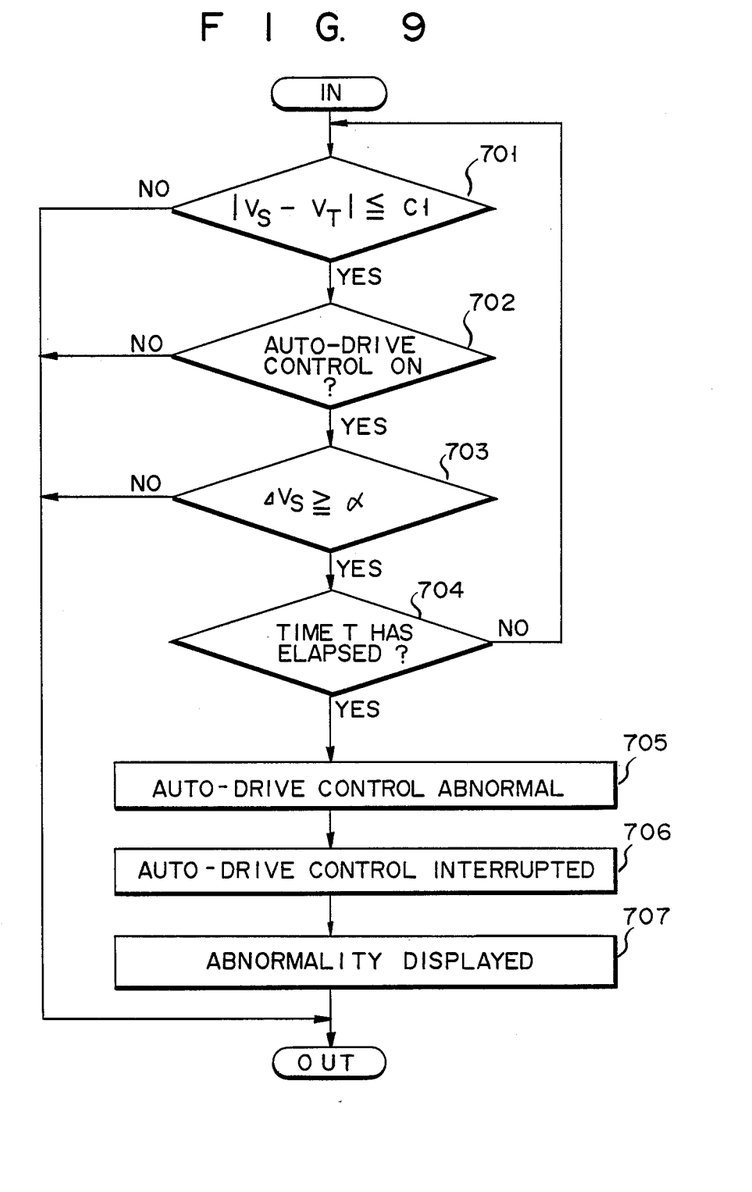
FIG. 9 shows a flowchart describing of processings by a means for checking an auto-drive control in the above diagnosis processing.

The details of the diagnosis flow by auto-drive control computer 15 in step 700, will be described with reference to FIG. 9. In step 701, it is checked if a difference between vehicle speeds $V_s$ and $V_T$, which are independently calculated, is smaller than set value C1. The speed $V_s$ is calculated by brake control computer 13 on the basis of wheel speed data Ws. The speed $V_T$ is calculated by transmission control computer 12, using the number of revolutions Ts of the transmission output shaft.

In step 701, if that speed difference is below set value C1, the computer judges that speed data Ws and Ts are correct, and advances to step 702. In this step 702, it is checked whether or not the control mode is in the auto-drive mode. If auto-drive control computer 15 is not cancelled, and the data representing the performing of the auto-drive control mode, not the acceleration or deceleration mode, is produced, diagnosis computer 17 determines that the auto-drive control is being performed, and goes to step 703.

Step 703 detects vehicle acceleration Δ Vs on the basis of the vehicle speed (or wheel speed data Ws) as determined to be correct data in step 701, and determines if acceleration Δ Vs is above set value α. When the auto-drive control is being performed and the actual acceleration Δ Vs exceeds set value α, step 704 determines that such a condition continues for a predetermined period T of time. In the next step 705, if such an acceleration condition exists for a time T, it is determined that the auto drive control is abnormal. In step 706, a command is issued to cancel the control by auto drive control computer 15. In step 707, the fact that computer 15 is malfunctioning is displayed visually.

Figure 10:
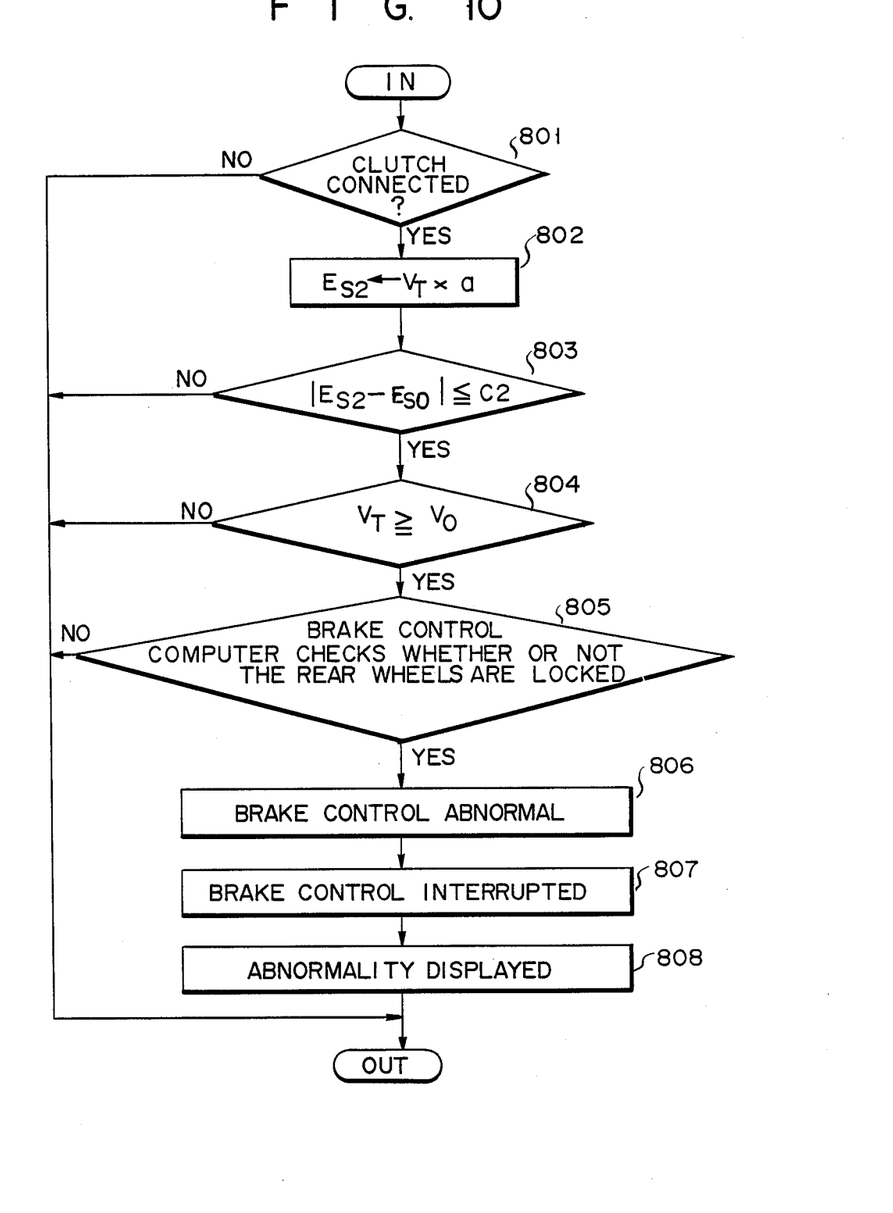
FIG. 10 shows a flowchart for explaining a flow of trouble diagnosis processing by a brake control computer.

FIG. 10 shows a control flow for the abnormal diagnosis processing by diagnosis computer 17. First, step 801 checks if the clutch is connected or not. If it is connected, control goes to step 802 where engine speed Es2 is obtained. The engine speed Es2 is calculated on the basis of vehicle speed data VT and gear ratio "a". Step 803 compares the engine speed Es0 calculated by engine control computer 11 with the engine speed Es2 computed in step 802, and checks if the difference between them is within set value C2. If this difference is within set value C2, the computer judges that engine speed Es0 has a correct value, and goes to step 804.

In step 804, vehicle speed $V_T$ is compared with set vehicle speed Vo. If vehicle speed $V_T$ is higher than set value Vo, the computer advances to step 805. In step 805, brake control computer 13 checks the locking states of the rear wheels, or the drive wheels of the vehicle. If it is decided that the rear wheels are locked, brake control computer 13 is determined to be abnormal in step 806. Then in step 807, the brake control by computer 13 is interrupted, and in step 808, the abnormality is visually displayed on CRT display 202 in step 808.

Diagnosis computer 17 performs not only the diagnosis of control computers 11 to 15 described thus far, but also the diagnosis of the controlled objects as controlled by the computers.

Figure 11:
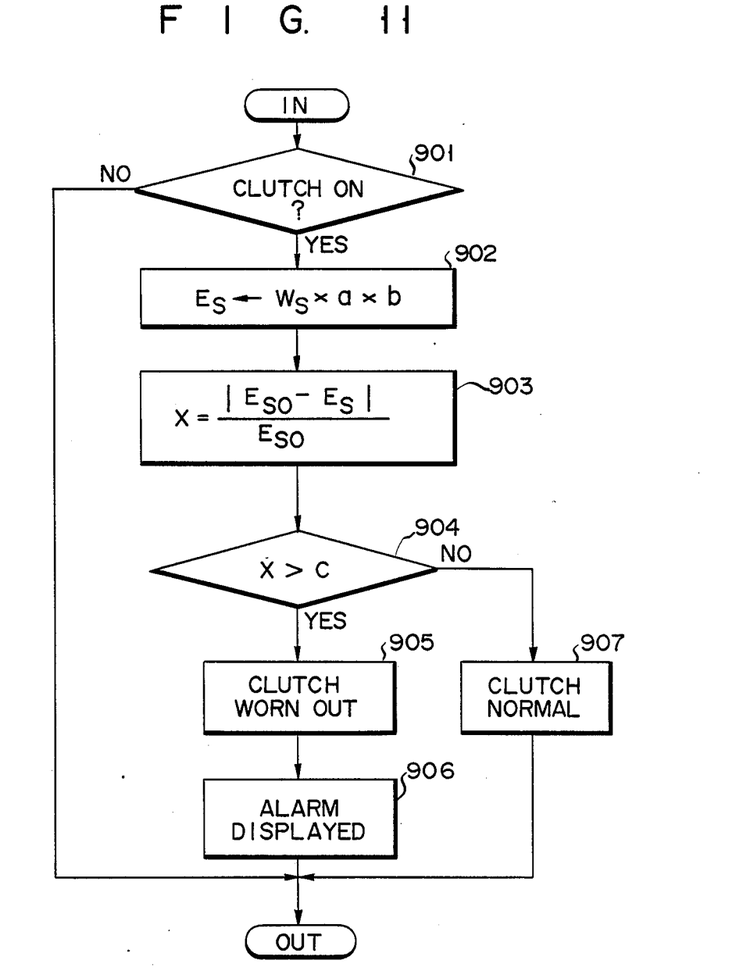
FIG. 11 shows a flowchart for describing a flow of the processings for the trouble diagnosis operation for a clutch mechanism.

FIG. 11 illustrates a flow of the processing for the operation of diagnosing the clutch, for example, by diagnosis computer 17. The clutch is a mechanism for transmitting the drive force of the engine to the propeller shaft. The diagnosis processing is performed in accordance with the interrupt operation for control shown in FIG. 7.

First, in step 901, it is decided whether or not the clutch is connected. If it is decided that the clutch is disconnected, this routine is ended. If step 901 decides that the clutch is connected, control advances to step 902, where reference engine speed Es is calculated. Engine speed Es is calculated from the gear ratio "a" and reduction ratio "b" of the gearbox and the wheel speed Ws, by using the following formula $$Es = Ws \times a \times b$$

Using the reference engine speed Es and engine speed data Es0 flowing in the network, slip ratio X of the clutch is calculated in step 903, according to the following formula $$X = (|EsO - Es|)/EsO$$

Step 904 decides whether slip ratio X calculated in step 903 is larger than the reference value C. If it is decided that X is larger or smaller than C, step 905 decides that the clutch has been worn out. In step 906, the warning display operation is executed, to direct the driver to check and replace the clutch. If step 904 decides that X is smaller than C, step 907 decides that the clutch is normal.

As described above, control data used in each control system and the control data obtained by logical operations are flowing in the network at all times. Diagnosis computer 17 transfers the data to large capacity memory 18 at all times, and can check whether or not the values of respective data is normal. If the data are abnormal, the data immediately before and after the time of trouble occurring are stored.

The memory area of large capacity memory 18 is segmented into a plurality of blocks. The data stored when an abnormality occurs, is stored in one of these blocks. The data at the time of the abnormality occurrence is kept stored, until an erase command is issued by either a driver or a repair shop.

The arrangement of the segmented memory area of memory 18, was selected so that if trouble occurs, and the data representative of this trouble occurrence is set in one memory block of memory 18, use of another memory block allows the similar processing to be executed continuously. Therefore, the diagnosis data as generated responsive to the trouble occurrence can be smoothly stored. The diagnosis control of the electronic control systems can very effectively be executed.

In a repair shop or a service station, the diagnosis data stored in large capacity memory 18 can be read out through diagnosis computer 17 or an external data processing computer which is connectable to the network by data bus 16. Therefore, in repairing the vehicle, the serviceman can quickly grasp the trouble condition under which the abnormality occurred. This makes very effective the repair and maintenance service of vehicles.

In this embodiment, only the control computers are connected to the network of data bus 16. Alternatively, intelligent sensors or intelligent actuators can be connected to the network. These functional devices would have the same diagnosis functions as those described above. While, in the embodiment, large capacity memory 18 is connected to diagnosis computer 17, but it may be directly connected to the network.

As seen from the foregoing, in the overall diagnosis apparatus, the vehicle-mounted control computers respectively corresponding to the controlled objects do not exist independently, but are supervised overall by means of the network. Further, the various data used in these computers are systematically collected and comprehensively controlled so that these vehicle-mounted control systems can effectively be executed. The occurrences of troubles are comprehensively controlled, and the analysis of the trouble-occurrence conditions can be executed reliably and easily. When a new control system is additionally installed on the vehicle, the diagnosis control can be used without any modification.

What is claimed is:

1. An overall diagnosis apparatus for vehicle mounted control devices comprising:
   a plurality of control computers respectively provided for a plurality of electronic control systems mounted on a vehicle, said control computers respectively executing the controls exclusively for these control systems;
   data transfer means for linking all of said control computers to allow data communication among said control computers; and
   a diagnosis computer connected to said transfer means, said diagnosis computer diagnosing operation of at least one of said electronic control systems to produce a diagnostic result, diagnosis of each said at least one electronic control system being on the basis of related data transferred through said transfer means from at least two of said control computers.

2. An apparatus according to claim 1, further comprising:
   display means for displaying the result of diagnosis by said diagnosis computer to indicate the result to a person on said vehicle.

3. An apparatus according to claim 1, further comprising:
   a large capacity memory connected to said diagnosis computer, said large capacity memory storing the diagnosis result obtained when said diagnosis computer diagnoses a trouble.

4. An apparatus according to claim 3, wherein:
   said large capacity memory stores, besides said diagnostic result, at least the data concerning said trouble diagnosis which is transferred to said transfer means before or after that diagnosis.

5. An apparatus according to claim 1, wherein:
   said plurality of control computers includes the following computers, and control data and detect data from these control computers are transferred to said diagnosis computer via said transfer means:
   an engine control computer for controlling, for example, a fuel injection amount of the engine mounted on said vehicle to an appropriate value according to a running condition of the engine;

an auto drive control computer for controlling the speed of said engine and the transmission, so as to coincide an actual running speed of said vehicle to a preset value of the running speed;

a brake control computer for preventing the locking of wheels when said vehicle is abruptly braked; and a transmission control computer for selecting a gear ratio setting position of the gearbox which transmits the driving force of said engine to wheels, according to a running load.

6. An apparatus according to claim 5, wherein:

said diagnosis computer includes actual acceleration decision means for deciding the vehicle acceleration data on the basis of the data from said brake control computer and transmission control computer; means for judging if said acceleration data as decided by said acceleration decision means lasts for a period of time longer than a set time, when said drive control is in the auto drive mode; means for diagnosing that said auto drive control computer is abnormal when said judging means decides that said acceleration data lasts for a period of time longer than said set time.

7. An apparatus according to claim 6, wherein:

said diagnosis computer calculates a first vehicle running speed data on the basis of the wheel speed detected by said brake control computer, and also calculates a second vehicle running data on the basis of the output shaft detected by said transmission control computer, and decides the vehicle running speed on the basis of the rotating speed of said first and second vehicle running speed data.

8. An apparatus according to claim 5, wherein:

said diagnosis computer includes vehicle running speed decision means for recognizing a vehicle running speed on the basis of the data from said engine control computer, and transmission control computer, and decides whether this running speed is above or below a set value; means for detecting lock data indicating that the driven wheels of the vehicle are locked by said brake control data; and means for deciding that said brake control computer is abnormal, when said lock data is being detected.

9. An apparatus according to claim 8, further comprising:

means for checking the clutch connection, said means diagnosing an abnormality of said brake control computer when the clutch is determined to be connected.

10. An apparatus according to claim 8, wherein:

said diagnosis computer includes means for calculating engine speed data on the basis of the gear ratio data and reduction ratio obtained by transmission control computer, and wheel speed data obtained by brake control computer; means for calculating a slip ratio of the clutch on the basis of the engine speed data calculated by the above means and engine speed data obtained by the engine control computer; and means for deciding that, if the slip ratio calculated by the above means is above a set value, the clutch is worn out.

11. An apparatus according to claim 1, wherein:

said transfer means includes a common data bus, connected to said control computers and said diagnosis computer, for serial communication.

12. An apparatus according to claim 1, wherein:

said transfer means includes a common data bus in the form of an optical fiber connected to said control computers and said diagnosis computer.

13. An apparatus according to claim 1, wherein:

each of said plurality of control computers includes means for diagnosing one of said electronic control systems associated with each of said control computers.

14. An apparatus according to claim 1, wherein said diagnosis computer is separate from all of said control computers.

15. A method for diagnosing a plurality of control computers by a diagnosis computer, said plurality of control computers respectively provided for a plurality of electronic control systems mounted on a vehicle, said method comprising the steps of:

(a) transferring related data from at least two of said control computers to said diagnosis computer;

(b) comparing said related data transferred at said step (a) with each other by said diagnosis computer; and (c) diagnosing trouble with at least one of said control computers corresponding to the result of said step (b) by said diagnosis computer.

* * * * *